United States Patent [19]

Thorn et al.

[11] Patent Number: 4,514,458
[45] Date of Patent: Apr. 30, 1985

[54] SPRING-LIKE MATERIAL FORMED OF COMPRESSED METALLIC WIRE

[75] Inventors: Richard P. Thorn; Bhagwati P. Gupta, both of Erie, Pa.

[73] Assignee: Lord Corporation, Erie, Pa.

[21] Appl. No.: 550,133

[22] Filed: Nov. 9, 1983

[51] Int. Cl.³ ............................................. D03D 13/00
[52] U.S. Cl. ....................................... 428/222; 428/36; 428/457; 428/906
[58] Field of Search ............. 428/371, 377, DIG. 906, 428/222, 36; 188/65.4, 372; 52/710, 379; 248/568, 570, 636, 560

[56] References Cited

U.S. PATENT DOCUMENTS

| | | |
|---|---|---|
| 2,687,270 | 8/1954 | Robinson .......................... 248/565 |
| 3,250,502 | 5/1966 | Robinson .......................... 248/560 |
| 3,700,012 | 10/1972 | Alderfer ............................. 428/222 |
| 3,866,925 | 2/1975 | Maimstrom et al. ............... 428/222 |
| 4,292,832 | 10/1981 | Nakae .................................. 72/365 |

FOREIGN PATENT DOCUMENTS 1009788 10/1962 United Kingdom .

Primary Examiner—James J. Bell
Attorney, Agent, or Firm—Joseph H. Heard

[57] ABSTRACT

The material is formed of a compressed and substantially homogeneous mass of randomly extending stainless steel wires which, prior to compression of the mass, contain helical coils and are substantially free from stress risers. The material is highly durable, and under compression loading has substantially isotropic and linear stress/strain properties at significantly differing strain levels.

8 Claims, 4 Drawing Figures

A - COILS
B - PRIOR ART

RADIAL - DOTTED
AXIAL - SOLID

SPRING-LIKE MATERIAL FORMED OF COMPRESSED METALLIC WIRE

FIELD OF THE INVENTION

This invention relates to materials which are formed of compressed metallic wire and have such spring-like properties as to be usable instead of elastomer in vibration or shock attenuating mounts and in other devices that must carry loads and accommodate motions of substantial magnitudes. The invention more specifically relates to an improved material of the aforesaid type which is economical to manufacture, is highly durable, and which has substantially isotropic and otherwise superior spring-like properties.

BACKGROUND OF THE INVENTION

Shock or vibration attenuating mounts and other devices employing rubber or a similar elastomeric material for load supporting and motion accommodating purposes are well known to those skilled in the art. Such material has excellent spring-like properties, but the use thereof is subject to certain practical limitations. When the loads imposed upon the elastomer are of very great magnitude, the amount of elastomeric material that must be employed may be so great as to cause the mount or other device to be of an excessive size in relation to the size of the site of its intended utilization. Additionally, elastomeric devices are unsuitable for use in locations where exposure to corrosive chemicals, extreme temperatures or other adverse environmental conditions will significantly impair the properties and/or useful life of the elastomer.

As an alternative to the use of elastomeric materials, it has heretofore been proposed to employ metallic materials for the dual purposes of load support and motion accommodation in utilizations where space is limited and/or adverse environmental conditions are present. Since solid metallic bodies are too stiff to accommodate large amplitude motions, the materials previously proposed for such use have usually been in the form of compacted masses of discreet metallic strands or the like. In addition to good resistance to adverse environmental conditions, the properties desired for such materials are similar to those possessed by elastomer. That is, the material should: (1) undergo significant elastic strain over an appreciable range of significant applied stresses; (2) while its modulus remains substantially constant; (3) irrespective of the particular direction of load application. Further, the material should be highly durable and not subject to premature failure under repeated cyclic loading over a long period of time. Insofar as applicants are aware, none of the metallic wire materials heretofore proposed possess all of the aforesaid desired properties and characteristics.

More specifically in the foregoing regard, the compressed metallic material now commonly used is comprised of high strength metallic wires which are first knitted together to form a mesh-like knitted fabric wherein adjacent sections of the wires are innerconnected by generally coplanar loops formed along their lengths during and by the knitting process. As in any knitted fabric, the capability of the innerconnected loops for movement relative to each other differs dramatically in different directions: i.e., the fabric is highly anisotropic. Following formation of the knitted fabric, layers of it are arranged in superimposed relationship to one another. The superimposed layers may and usually are then subjected to a gear-tooth or similar crimping or corrugating process, and are in any event then compressed within a die or the like to impart a desired shaped and density to the finished material. Notwithstanding the number and considerable expense of the manufacturing steps used in its formation, the aforesaid material has stress/strain characteristics which are significantly nonlinear in any direction and which are exceedingly anisotropic. A plot of such characteristics along two mutually perpendicular axes of the material produces curves which are each very nonlinear, eventually cross each other, have significantly different slopes at any given strain level, and which reflect that the compression stiffness of the material in one axial direction is only approximately one-half of its compression stiffness in the other axial direction. Additionally, it has been found that the aforesaid material formed of knitted metal wires tends to disintegrate when subjected to cyclic loading of substantial magnitude and duration. It is believed that this lack of durability is attributable in large part to the individual wires of the finished material having a multiplicity of localized stress concentrations or "risers" spaced along the lengths thereof. Although the wires selected for use in the material are usually smooth-surfaced ones formed of drawn stainless steel or the like, the process of knitting such wires together inherently produces a multiplicity of stress risers within the wires at spaced locations along their lengths. The step of crimping superimposed layers of the knitted fabric then adds additional stress risers and/or aggrevates those previously generated by the knitting process. The final step of compressing the superimposed layers of knitted fabric produces still other stress risers and further aggrevates those already present within the wires. The generation of some stress risers during the compression step is necessary to impart a desired final shape and density to the material. However, the stress risers generated by the knitting and, if employed, crimping processes are unnecessary and undesirable ones. Additionally, it is believed that compression of a knitted wire fabric may produce more stress risers than are required for shaping and/or densification purposes, due to the inability of the innerconnected and essentially two-dimensional loops of the knitted wires to significantly re-orient themselves in planes which are substantially perpendicular to the distorting forces imposed thereon. In any event, the prior-art metallic materials formed of superimposed and compressed layers of knitted metal fabric or mesh tend to disintegrate into small metallic particles when subjected to cyclic loads of significant magnitude and duration. Such disintegration not only causes the material to lose such spring-like motion accommodating properties as it originally possessed, but additionally results in the discharge from the material of small wire fragments which may seriously damage adjacent machinery components or the like.

DESCRIPTION OF THE PRIOR ART

In addition to the above-discussed metallic material formed of compressed layers of knitted wire fabric, the materials disclosed in each of the following U.S. Pats. may be deemed of interest to the present invention: U.S. Pat. Nos. 1,620,530, 1,959,104, 2,687,269, 2,687,270, 3,073,557 and 3,250,502.

The material of U.S. Pat. No. 1,620,530 is intended for use as a bearing or bushing. Although the material is stated to be resilient to some unspecified degree, it apparently is so highly compressed as to possess a stiffness closely approaching that possessed by and needed for solid metallic bearings and bushings, which customarily undergo a maximum elastic strain of less than one percent. The wool-like fibers employed in the material are cut from relatively soft metals (copper, bronze or brass). Metal fibers produced by a cutting process have stress risers throughout their lengths, and such fibers will rapidly disintegrate under cyclic loading. While the patent asserts that separation of the wool-like fibers will not adversely affect the ability of the compressed bearing-like mass thereof to support loads, which is the traditional function of a bearing or bushing material, the highly adverse affect of component disintegration upon the ability of a material to resiliently accommodate motion is an entirely different matter.

The material of U.S. Pat. No. 1,959,104 is stated to be useful as a cleaning or laundry pad, or as a coarse filtering medium. The metallic strands of the material are drawn while under tension and pressure over a knife edge. This causes the strands to not only possess helices, as described in the patent, but also stress risers along their lengths. The material is not homogeneous and is not precompressed. If the material were subjected to cyclic loads of substantial magnitude, it would quickly bottom out and disintegrate.

With respect to the remaining patents cited above, all of which were assigned to the same assignee, U.S. Pat. No. 2,687,269 and 2,687,270 each emphasize that the compressed wire materials thereof are characterized by a "modulus of elasticity [which]changes markedly under increasing amplitude". The latter patent goes on to further state that the load deflection curve of the material is characterized by a curvature much more pronounced than that of ordinary metal coil springs or rubber. The two later patents, U.S. Pat. Nos. 3,073,557 and 3,250,502, similarly state that the compressed-wire materials thereof respond nonlinearly to each successive increment of load. The patents further specify that the wires of the materials extend predominantly in sustantially parallel relationship to each other, and may be knitted together to form a fabric or mesh prior to compression thereof. As noted previously herein, metallic materials of the aforesaid type or types exhibit highly anisotropic responses to multi-directional loading and have poor durability.

SUMMARY OF THE INVENTION

The present invention provides a metallic load supporting and motion accommodating material which can be economically manufactured, is highly durable in use, and which has stress/strain characteristics or properties that are markedly superior to the prior-art material formed of knitted fabric or mesh. More specifically in latter regard the material of the present invention has, over all or at least an appreciable part of the designed load range thereof, stress/strain characteristics which are more substantially linearly related and which are substantially the same along either of two mutually perpendicular axes. That is, the material exhibits a substantially more constant modulus of elasticity and substantially isotropic properties.

In the preferred embodiment thereof, the material of the present invention is comprised of a compressed mass of drawn stainless steel wire having a high tensile strength and a diameter within the range of 0.0035 inch to 0.020 inch. The initially straight wires are provided, by a winding process, with helical coils which are spaced along the length of the wire at a pitch interval or distance within the approximate range of 0.05 inch to 0.30 inch and which have a diameter that is within the same range and is at least ten times the wire diameter. The coil diameter and the winding process by which the coils are formed are such as to avoid the formation of stress risers such as are inherent in metallic wires or strands which are formed by a cutting or shaving operation or which are curled by passage in a tensioned condition over a knife edge or the like. Following formation of the coils thereon, the wires are brought together to form a loose and substantially homogeneous mass. The wires extend throughout such mass in substantially random relationship to each other and are loosely entangled. The loose mass of randomly extending entangled wires is compressed within a die to densify the same and to impart a desired shape to the resulting finished material. The compressive force imposed upon the material within the die is in excess of the maximum force to be encountered by the finished material in use, and is sufficient to cause the density of the finished material in its unloaded state to be within the range of 10 percent to 50 percent of the density of the metal (preferably stainless steel) from which its constituent wire was drawn.

Compression densification and shaping of the substantially homogeneous mass of randomly extending wires of course must and does stress portions of the wires beyond their elastic limit and effect plastic yielding and set thereof. However, the number and severity of stress risers in the wire of the finished material is minimized since the wire is substantially free of the same prior to the compression step. Additional benefit in the foregoing may result from the fact that the three-dimensional wire coils of the present material are better able, in comparison to the interlocked and essentially two-dimensional loops of knitted fabric material, to assume distortion minimizing orientations during compression.

DESCRIPTION OF THE DRAWINGS

Other features of the invention will be apparent from the following description of an illustrative embodiment thereof, which should be read in conjunction with the accompanying drawings in which.

DESCRIPTION OF THE PREFERRED EMBODIMENT

Figure 1:
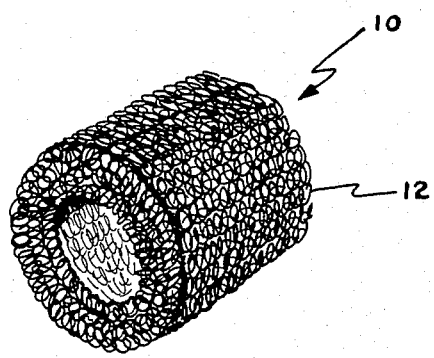
FIG. 1 is a perspective view of a load supporting and motion accommodating material in accordance with the invention, the material being comprised of a compressed mass of generally randomly extending coil-containing wires, and the material illustratively having an annular shape.

Referring more particularly to the drawings, the force accommodating material 10 shown in FIG. 1 is comprised of a mass of randomly extending coil-containing wire or wires. The latter terms are used interchangeably herein since, in relation to the dimensions of the compacted material 10 formed therefrom, the length of each constituent wire is so great as to render it immaterial whether only one or a plurality of them are employed. It should therefore be understood that when the plural form "wires" is used herein, the same is intended to encompass not only a plurality of wires, but also elongate sections of a single one.

Although the material 10 of FIG. 1 is shown as having an annular shape, this is for purposes of illustration only. The material can be shaped into substantially whatever configuration is most suitable for its particular intended utilization.

Figure 2:
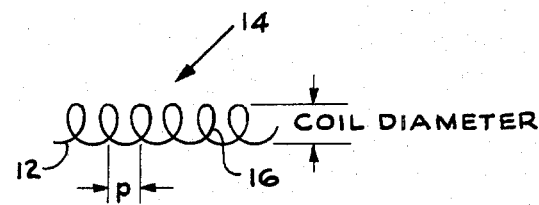
FIG. 2 is a fragmentary enlarged elevational view of a wire segment having a plurality of coils.

The constituent wire 12 of material 10 is drawn stainless steel having a tensile strength of at least 170,000 psi and preferably higher. The wire diameter is within the range of 0.0035 inch–0.020 inch. Such wire, which is commercially available, has spring-like qualities and is substantially smooth-surfaced and free from stress risers. The first step in manufacturing material according to the present invention from the substantially straight wire consists in providing the same with a plurality of helical coils along its length. FIG. 2 of the drawings depicts, somewhat schematically, a segment of the wire 12 upon which a plurality of the aforesaid coils 14 have been formed. The diameter of each coil 14, and the distance or pitch spacing p between adjacent ones of them, are each within the range of approximately 0.05 inch to 0.30 inch. Additionally, the diameter of each coil 14 is at least ten times and preferably is approximately twenty times, the diameter of wire 12. The coil dimensions and pitch spacings, and in addition the technique employed in their formation, are such as to avoid the formation of stress risers, i.e., localized stress concentrations, within or upon the surface of wire 12. Such stress risers inevitably are present within metallic strands of material produced by a cutting operation, and also in metallic strands which are drawn under tension over a knife edge or the like. Microscopic examination of strands of either of the latter types reveals that the surfaces thereof contain myriad nicks, scratches and other stress-concentrating irregularities. It is also believed that stress risers are present within wires which are knitted together to form a fabric of mesh, as a result of the angular deflection of the wires about and by the knitting machine components which form the interconnected loops of the fabric. In constrast to the foregoing procedures, the preferred method of formation of the coils 14 is by feeding wire 12 onto a smooth rotating mandrel (not shown) and coiling the wire thereabout. The diameter of and the pitch spacing between the coils can be easily regulated the mandrel size and speed of rotation, respectively. The aforesaid method of coil formation not only is desirable from the viewpoint of avoiding the formation of stress risers, but also is a relatively simple and inexpensive one. After formation of coils 14 thereon, a desired quantity of wires 12 are brought together to define a substantially homogeneous mass wherein the wires and their coils extend in generally random relationship to, and are loosely entangled with, each other. This loose mass is then placed in the cavity of a die or the like (not shown) within which it is compacted to produce the finished material 10. The compaction force imposed upon the mass within the die is greater than the maximum force to be applied to the finished material 10 during use thereof, is sufficient to effect plastic deformation of some parts of the wires 12, and imparts a density to the finished material 10 which is within the range of approximately 10 percent–50 percent of the density of the metal of which wires 12 are made. Thus, when the wires 12 are of drawn stainless steel, the density of material 10 is within the range of approximately 0.028 to 0.14 pounds per cubic inch.

Figure 3:
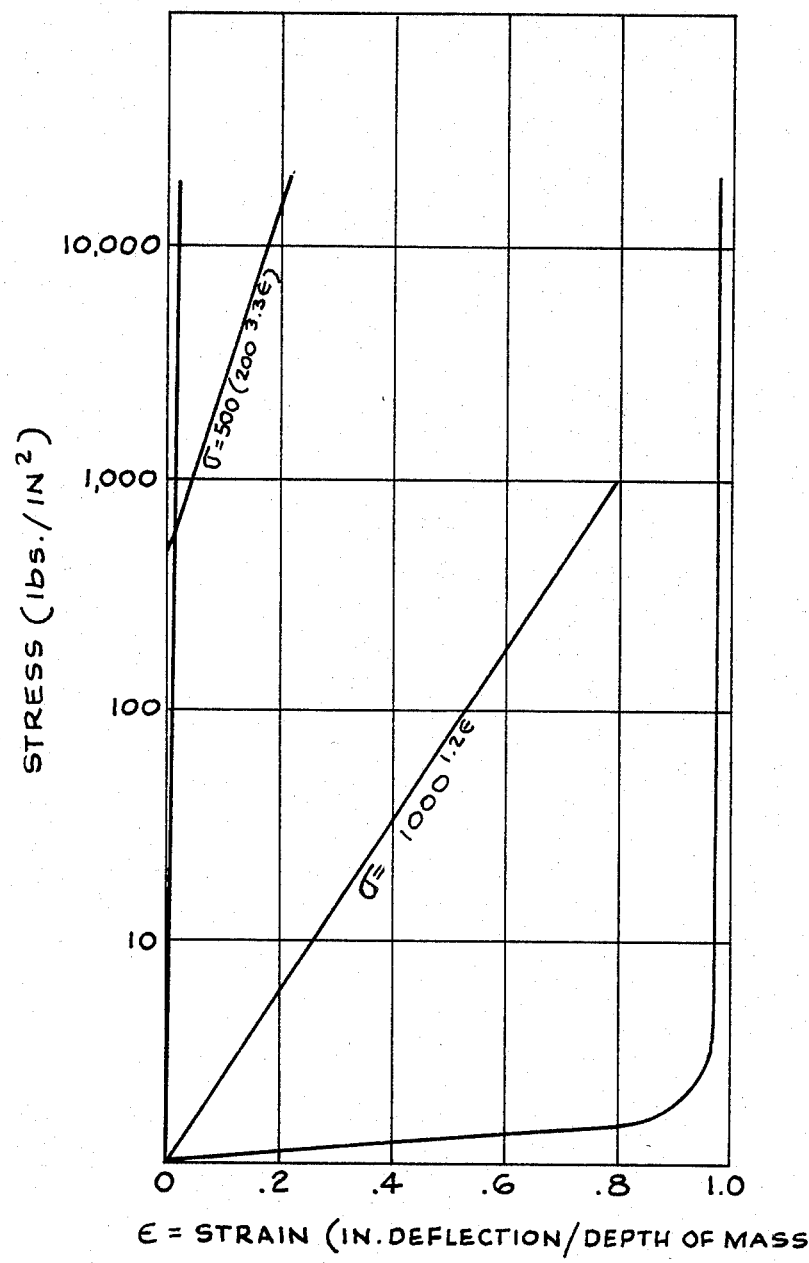
FIG. 3 is a stress/strain graph illustrating the region of optimum utilization of the material of the present invention and showing, for purposes of contrast, the stress/strain curves of two materials which are unsuitable for the dual purposes of supporting loads and accommodating motions of large magnitudes.

The graph of FIG. 3 illustrates the general region or area of utilization of load supporting and motion accommodating material in accordance with the present invention. For purposes of comparison, the graph also shows two stress/strain curves 16, 18 which are respectively typical of a bearing or other solid metal material and of a loosely compacted steel wool pad of the like. It is obvious that neither of the materials depicted by the curves 14, 16 is suitable for supporting loads and accommodating motions of substantial magnitudes. The solid metallic material (curve 14) is too stiff, and undergoes only minor strain in response to stresses of up to the indicated 10,000 psi. The other material (curve 16) is too soft. Under stresses of only very small magnitude, the material undergoes the maximum strain of which it is capable, "bottoms out" and becomes very stiff. The region or area of utility of the material of the present invention is intermediate the curves 14, 16 and is more specifically delineated by the two additionally illustrated curves 18, 20 which are respectively defined by the equations $\sigma = 500 \ (200^{3.3\epsilon})$ and $\sigma = 1000^{1.25\epsilon}$, wherein $\sigma$ is stress in psi and $\epsilon$ is strain in inches per inch. More specifically in the foregoing regard, the stress/strain curve of a typical material formed in accordance with the present invention will be in accordance with the relationship $\sigma \leq 500 \ (200^{3.3\epsilon})$ and $\geq 1000^{1.25\epsilon}$, for values of $\epsilon$ (strain) up to approximately 0.50 inches per inch. As will be appreciated by those skilled in the art, the aforesaid range of stress/strain properties encompasses those exhibited by many elastomeric materials.

Figure 4:
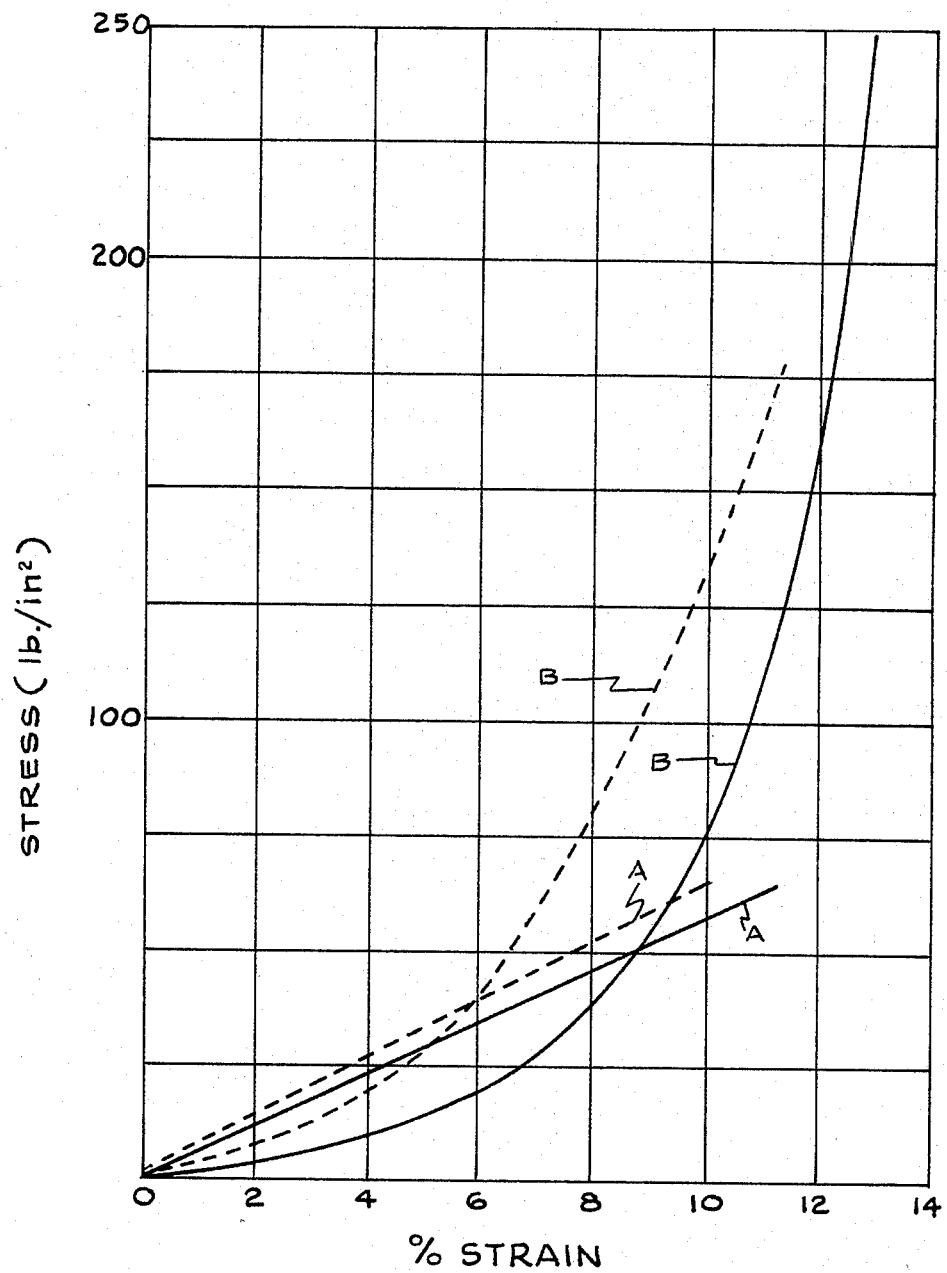
FIG. 4 is a graphical comparison of illustrative stress/strain properties of material according to the present invention and of a conventional force attenuating material formed of knitted wire fabric.

The graph of FIG. 4 of the drawings, to which reference is now made, illustrates very important differences between the stress/strain characteristics of material in accordance with the present invention and material formed of compressed knitted fabric or mesh. The stress/strain curves A, A are those produced by compression along two mutually perpendicular axes of a rectangular test specimen prepared in accordance with the present invention. The stress/strain curves B, B are those produced by compression along two mutually axes of a test specimen of identical size and weight but formed in a conventional manner of knitted metallic fabric or mesh. The curves B, B reveal that the knitted mesh material is highly anisotropic, the compression stiffness thereof along one axis differing by as much as fifty percent from its stiffness along the other axis; and that the material's modulus (curve slope) along either axis is significantly different at different strain levels. In contrast, the curves A, A show that the stress/strain properties of the material in accordance with the present invention are much more linear along each axis, manifesting a substantially constant modulus; and are essentially the same along both axes. Although the strain levels of the FIG. 4 graph extend only to 14 percent, the compression moduli along mutually perpendicular axes of material according to the present invention will typically differ by less than ±25 percent at strains of from 0 to at least 20 percent, and in some instances 30 percent, and will each remain substantially constant over a strain range of from 0 to approximately 30 percent.

The previously specified ranges of wire diameter, coil diameter, coil pitch spacing, and compacted density of material 10 permit it to be tailored so as to possess a particular substantially constant modulus most appropriate for its intended use. Moduli of from approximately 20 psi to 2000 psi are readily obtainable.

While a preferred embodiment of the invention has been specifically shown and described, this was for purposes of illustration only, and not for purposes of limitation, the scope of the invention being in accordance with the following claims.

We claim:

1. A resilient and durable metallic material for supporting loads and accommodating motions within a preselected range of magnitudes, comprising:
    a substantially homogeneous mass of drawn metallic wires extending in substantially random relationship to each other; said wires having a predetermined density and high tensile strength, and the diameter thereof being within the range of 0.0035 inch to 0.020 inch;
    said wires as initially incorporated within said mass including three-dimensional helical coils spaced along the length thereof at pitch intervals within the range of 0.05 to 0.30 inch and having diameters at least ten times the wire diameter and within the range of 0.05 inch to 0.30 inch;
    said mass of coil-containing wires being compacted, by a compression force greater than the maximum force to be applied to the material during use, to impart thereto a preselected shape and a density within the range of 10 percent to 50 percent of said predetermined density;
    said wires being substantially free of stress risers other than ones produced by the compaction of mass;
    the compression stress/strain properties of said compacted mass being in accordance with the relationship $$\sigma \leq 500 \ (200^{3.3\epsilon}) \text{ and } \geq 1000^{1.25\epsilon}$$

for values of $\epsilon$ from 0 to 0.50, wherein $\sigma$ is stress in psi and $\epsilon$ is strain in inches per inch, and said properties being substantially isotropic at strain levels of from 0 to 0.20.

2. A material as in claim 1, wherein said wires are made of drawn stainless steel and have a tensile strength of at least 170,000 psi.

3. A material as in claim 2, wherein the density of said compacted mass is within the range of 0.028 to 0.14 pounds per cubic inch.

4. A material as in claim 1, wherein said stress/strain properties of said material are substantially linear at strain levels of from 0 to 0.20.

5. A material as in claim 4, wherein said compacted mass has a substantially constant compression modulus at strains of up to approximately 0.30.

6. A material as in claim 5, wherein said substantially constant modulus is within the range of 20 psi to 2000 psi.

7. A material as in claim 6, wherein the compression modulii of said compacted mass along two mutually perpendicular thereof differ from each other by less than ±25 percent at strain levels of from 0 to 0.20.

8. A material as in claim 1, wherein the pre-compaction diameter of said coils is approximately twenty times the diameter of said wire.

* * * * *